(12) United States Patent
Sulaiman et al.

(10) Patent No.: US 12,448,951 B2
(45) Date of Patent: Oct. 21, 2025

(54) CONNECTOR ARRANGEMENT FOR A WIND TURBINE DOWN CONDUCTOR, AND WIND TURBINE

(71) Applicant: Siemens Gamesa Renewable Energy A/S, Brande (DK)

(72) Inventors: Sajeesh Sulaiman, Karnataka (IN); Ramakrishnan Manickam, Tamilnadu (IN); Aravind Devaraj, Kerala (IN); Rajanikanth Reddy Dasari, Silkeborg (DK); Haritha Subramanian Kalyanaraman, Horsens (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/286,282

(22) PCT Filed: Mar. 8, 2022

(86) PCT No.: PCT/EP2022/055909
§ 371 (c)(1),
(2) Date: Oct. 10, 2023

(87) PCT Pub. No.: WO2022/218607
PCT Pub. Date: Oct. 20, 2022

(65) Prior Publication Data
US 2024/0376867 A1    Nov. 14, 2024

(30) Foreign Application Priority Data
Apr. 14, 2021    (EP) ..................................... 21168337

(51) Int. Cl.
*F03D 80/30*    (2016.01)
*H01R 4/30*    (2006.01)
*H01R 31/06*    (2006.01)

(52) U.S. Cl.
CPC ............... *F03D 80/30* (2016.05); *H01R 4/30* (2013.01); *H01R 31/06* (2013.01)

(58) Field of Classification Search
CPC ...... F03D 80/30; F03D 80/301; F03D 1/0675; B64D 45/02; H02G 13/00; F05B 2240/85
See application file for complete search history.

(56) References Cited

U.S. PATENT DOCUMENTS 6,457,943 B1 * 10/2002 Olsen ...................... F03D 80/30
416/241 A
8,643,997 B2 * 2/2014 Lyngby .................... H02H 7/24
361/117

(Continued)

FOREIGN PATENT DOCUMENTS

CN          203 730 221 U      7/2014
CN          108 551 080 A      9/2018
DE       10 2012 205208 B3     9/2013

OTHER PUBLICATIONS

Merriam-Webster "connected" definition, retrieved Feb. 20, 2025 (Year: 2025).*

(Continued)

*Primary Examiner* — Courtney D Heinle
*Assistant Examiner* — Ryan C Clark
(74) *Attorney, Agent, or Firm* — Schmeiser, Olsen & Watts, LLP

(57) ABSTRACT

A connector arrangement for a wind turbine down conductor is provided, including a lightning conductor cable, a first connection element, a second connection element and a tube, wherein a first end of the cable is connected to the first connection element and a second end of the cable is connected to the second connection element, wherein the tube surrounds at least a portion of the cable between the first end and the second end of the cable, wherein the tube is fixedly attached to the first connection element and relatively movable to the second connection element.

15 Claims, 2 Drawing Sheets

(56) References Cited

U.S. PATENT DOCUMENTS

Figure 1:
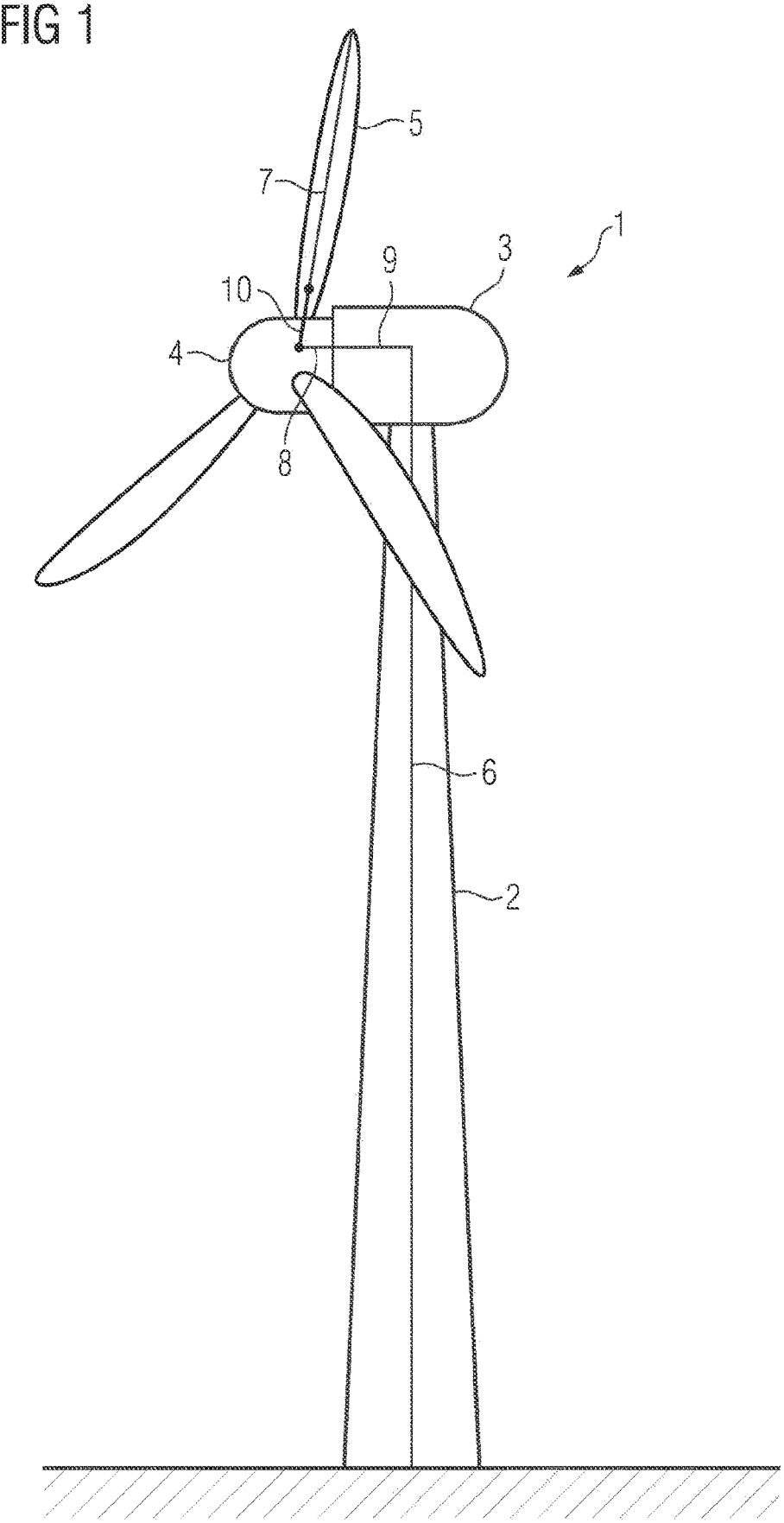

| | | | | |
|---|---|---|---|---|
| 10,051,717 B2* | 8/2018 | Mckay | .................... | F03D 80/85 |
| 11,835,034 B1* | 12/2023 | Gracia Suberviola | .. | F03D 80/30 |
| 2006/0013695 A1* | 1/2006 | Pedersen | ................. | F03D 80/30 |
| | | | | 416/248 |
| 2006/0126252 A1* | 6/2006 | Mortensen | .............. | F03D 80/30 |
| | | | | 361/118 |
| 2006/0280613 A1* | 12/2006 | Hansen | .................. | H02G 13/00 |
| | | | | 416/230 |
| 2011/0305573 A1* | 12/2011 | Olsen | ...................... | F03D 80/30 |
| | | | | 416/146 R |
| 2012/0048612 A1* | 3/2012 | Bunyan | ................ | H05K 9/0016 |
| | | | | 174/358 |
| 2012/0219420 A1* | 8/2012 | Lewke | ................... | F03D 80/30 |
| | | | | 416/146 R |
| 2012/0269631 A1* | 10/2012 | Lewke | ................... | F03D 80/30 |
| | | | | 416/146 R |
| 2016/0053747 A1* | 2/2016 | Olesen | .................... | F03D 80/40 |
| | | | | 219/553 |
| 2017/0217604 A1* | 8/2017 | Birchak | ................ | B64D 13/04 |

OTHER PUBLICATIONS

International Search Report and Written Opinion for PCT/EP2022/055909, mailed on May 30, 2022.

\* cited by examiner

CONNECTOR ARRANGEMENT FOR A WIND TURBINE DOWN CONDUCTOR, AND WIND TURBINE

CROSS-REFERENCE TO RELATED APPLICATIONS

This application claims priority to PCT Application No. PCT/EP2022/055909, having a filing date of Mar. 8, 2022, which claims priority to EP application No. 21168337.0, having a filing date of Apr. 14, 2021, the entire contents both of which are hereby incorporated by reference.

FIELD OF TECHNOLOGY

The following relates to a connector arrangement for a wind turbine down conductor, comprising a lightning conductor cable, a first connection element, a second connection element and a tube, wherein a first end of the cable is connected to the first connection element and a second element of the cable is connected to the second connection element. Furthermore, the following relates to a wind turbine.

BACKGROUND

One challenge in the design of modern wind turbines is the lightning protection system that protects the wind turbine from lightning strikes. Since wind turbines are normally the tallest structures in an area, the probability that the wind turbine is hit by a lightning strike is very high, in particular for offshore wind turbines. In most cases, the lightning strike hits the tallest point of the wind turbine, which is normally one of the rotor blades.

Modern wind turbines increase in size to maximize their electrical power output. Taller wind turbines are more prone to be hit by a lightning strike and are therefore more often hit by lightning strikes. Also, the installation of wind farms comprising a plurality of neighbouring wind turbines increases the lightning strike frequency in the wind turbines since the lightning strikes are attracted by the tall structures of the wind turbines.

In the interior of a wind turbine, a network of electrical down conductors is used to protect the wind turbine from lightning strikes by conducting the electrical lightning current along a predetermined path of lightning down conductors. The down conductors forming a lightning protection system run from the tip of each rotor blade all the way down to the base of the tower of the wind turbine. Therefore, a plurality of down conductors has to be connected to each other using connection means, which are also adapted to conduct the lightning current. It is known to use metal brackets or cables as connection means. The down conductors and the connection means have to be adapted to conduct the high amplitude lightning currents that result from a lightning strike.

In addition to the high-amplitude lightning current, also large magnetic fields occur when a lightning current is conducted in the down conductors. Therefore, the connection means must also resist these magnetic fields, or the mechanical loads resulting from the interaction between the magnetic fields and the connection means, respectively.

Furthermore, some of the connection means need to bridge junction sections between different parts of the wind turbine that are relatively movable to each other. In particular a wind turbine blade is movable relatively to the hub of the wind turbine. The wind turbine blade generates the prime load in the wind turbine and it may move relatively to the hub due to its weight and due to the static and/or dynamic wind loads. This may cause a significant amount of deflection in the blade root section, which is adjacent to the hub of the wind turbine. The deflection between a blade and the hub may create a mechanical load in a connection means connected to both a conductor in the blade and a conductor in the hub. Therefore, the connection means has to be able to take these mechanical loads during operation of the wind turbine while maintaining the electrical connection between the down conductors.

In addition, a connection means arranged between a rotor blade and the hub is rotating during the operation of the wind turbine so that it is subject to an alternating mechanical load caused by the alternating action of a gravitational force due to the self-weight of the connection means. For a wind turbine down conductor, it is therefore desirable to have a connection means, or a connector arrangement, respectively, which is able to take these mechanical loads while maintaining a reliable electrical connection between the down conductors, in particular during the life-time of the wind turbine.

SUMMARY

An aspect relates to an improved connector arrangement for a wind turbine down conductor, in particular with an improved ability to take mechanical loads.

According to embodiments of the invention, this aspect is solved by a connector arrangement as initially described, wherein the tube surrounds at least a portion of the cable between the first end and the second end of the cable, wherein the tube is fixedly attached to the first connection element and relatively movable to the second connection element.

The first connection element, to which the first end of the cable is connected, as well as the second connection element, to which the second end of the cable is attached, may each be attached to a down conductor, or to an electrically conducting member integrated in a wind turbine down conductor, respectively. The connecting elements are in particular electrically conductive, so that a lightning current may be conducted through both connection elements and through the cable, which is attached to both connection elements.

The tube surrounds the cable at least partly in a portion between the connection elements. Hence a portion of the cable between the first end and the second end of the cable is arranged inside the tube. The tube protects the cable and restricts swinging movements of the cable, which may occur for instance at connector arrangements that are arranged in rotating parts of a wind turbine, for example in the hub or in a blade. Such connector arrangements may rotate around the axis of the hub during the operation of the wind turbine, so that, due to its self-weight, the cable performs a swinging movement, or a to-and-fro movement, respectively. Since the tube surrounds the cable at least partly, the swinging movement of the cable arranged at least partly inside the tube is restricted. This reduces the mechanical loads that are acting on the cable caused by a rotation of the connector arrangement during operation of the wind turbine.

Due to the fixed attachment of the tube only to the first connection element, in particular a torsional movement between the first connection element and the second connection element remains possible even when using a comparatively stiff tube. The cable, which is more flexible than the tube, may twist partly as a result of such a torsional movement without being damaged. The ability of the connector arrangement to take torsional loads is in particular advantageous when the connector arrangement is arranged between a rotor blade and the hub of the wind turbine, since in the root region of a wind turbine blade, a torsion relative to the hub may occur when the rotor blade is loaded during the operation of the wind turbine. Also the mechanical loads resulting from a relative movement between two wind turbine parts may be taken reliably by the connector arrangement.

The usage of the cable as a part of the connector arrangement has the advantage that it is less likely to be damaged due to the electromagnetic forces arising in a lightning strike since the cable is flexible and therefore more resistant against the intense and short-duration magnetic fields occurring during the conduction of a lightning current. The magnetic fields may cause large electromagnetic forces and therefore lager stress and strain acting on the connector arrangement, which may cause for instance a bracket to deform and/or to embrittle over time. Compared to a more rigid metal bracket, the cable is less likely to be damaged by the magnetic fields occurring during a lightning strike. Therefore, also the mechanical loads resulting from a magnetic field may be taken reliably by the connector arrangement.

Since the tube is fixedly attached and therefore not movable relatively to the first connection element, a stable fixation of the tube relative to the first connection element is obtained. Since the tube is not fixedly attached to the second connection element, the tube and the second connection element are relatively movable to each other. This allows in particular for taking torsional loads between the first and second connection element without affecting the tube. In addition, also a longitudinal load may be taken by the connector arrangement.

The cable may be cylindrical and the tube may comprise a cylindrical cavity, in which the cable is arranged. It is also possible that the cable and/or the tube have other geometries that allow an arrangement of the cable inside the tube. The cable comprises at least one conductive core and it may comprise an insulating sheath, wherein in particular the conductive core is attached to the first and the second connection element for establishing an electrical connection between the first and the second connection element.

Compared to conventional lightning brackets, which may be used to connect two down conductors, the connector arrangement according to embodiments of the invention has the advantage that it is more resistant against magnetic fields occurring during the conduction of a lightning current. In addition, by arranging the cable at least partly in the tube, the effects of a swinging movement of the cable, which may occur for instance at a connector arrangement arranged in a hub of the wind turbine, are at least partly restricted, so that the effects of the swinging movements on the connection between the cable and the connection elements and/or the occurrence of wear in the cable due to the permanent swinging movement are minimized.

The connector arrangement allows for conducting high amplitude lightning currents without the occurrence of cracks that might occur in metal brackets in regions of high stress and strain. Since the cable is more flexible, it is more resistant against the magnetic forces and therefore no particular regions with high stress and strain occur during the conduction of a lightning current. A high reliability of the connector arrangement during a long life-time of several years is obtained.

In an embodiment, a gap is formed between the outer circumference of the cable and the inner circumference of the tube. The gap facilitates a torsional movement between the first and the second connection element, or a twisting movement of the cable relative to the tube, respectively. In particular, the gap extends around the entire outer circumference of the cable. The size of the gap may depend on the length of the cable and/or the length of the portion of the cable, which is surrounded by the tube. The gap is in particular small enough to restrict a swinging movement of the cable during a rotation of the connector arrangement.

In embodiments of the invention, the first connection element comprises a fixation clamp, which tightly encompasses the outer circumference of the tube for fixing the tube. By tightly encompassing the outer circumference of the tube, a relative movement between the tube and the first connection element is prevented, so that the tube is fixedly attached to the first connection element. The fixation clamp may be in particular electrically insulating, so that a lightning current is only conducted through the cable and not through the fixation clamp, or the tube, respectively.

In an embodiment, the second connection element comprises a restriction clamp surrounding the tube at least partly and restricting a movement of the tube in radial direction of the tube. The restriction clamp of the second connection element restricts a movement of the tube in radial direction of the tube and therefore may be used to restrict a swinging movement of the end of the tube at the second connection element caused by a rotation of the connector arrangement. The restriction clamp in particular restricts only the movement in the radial direction of the tube, so that a movement in a longitudinal direction and a torsional movement of the tube in respect with the second connection element are possible to maintain the ability of the connector arrangement to take torsional and/or longitudinal loads.

In an embodiment, the tube and the restriction clamp form a sliding bearing or a gap is formed between an outer circumference of the tube and an inner circumference of the restriction clamp. When a sliding bearing, or a plain bearing, respectively, is formed between the tube and the restriction clamp, the radial movement of the tube with respect to the second connection element is totally restricted. However, a torsional movement and/or a longitudinal movement of the tube with respect to the second connection element are not restricted by the sliding bearing. When a gap is formed between the outer circumference of the tube and the inner circumference of the restriction clamp, a torsional movement of the tube with respect to the second connection element is only partially restricted, since a radial movement of the tube through the gap remains possible. A radial movement and/or a torsional movement of the tube are not restricted by the gap between the outer circumference of the tube and the inner circumference of the restriction clamp.

In embodiments of the invention, the first connection element and/or the second connection element comprise an attachment portion, which is aligned parallel to a portion of the cable, wherein the respective clamp of the connection element is attached to the attachment portion. The attachment portion of the first connection element is arranged parallelly to a portion of the cable near the first end of the cable. The fixation clamp of the first connection element may be arranged on the attachment portion of the first connection element, so that the tube is fixedly attached in the vicinity of the first end of the cable.

The attachment portion of the second connection element may be aligned parallel to a portion of the cable which is near the second end of the cable. On the attachment portion of the second connection element, the restriction clamp of the second connection element may be arranged. This allows for restricting the movement of a portion of the tube in the vicinity of the second end of the cable. The arrangement of the fixation clamp and the restriction clamp allows for arranging the tube around a comparable large portion of the cable between the first and the second end of the cable. Furthermore, a simple and robust structure of the connector arrangement is achieved facilitating its fabrication, its installation and/or its repair, if necessary.

In an embodiment, the first connection element and/or the second connection element comprise a bracket with a first connection portion, to which the end of the cable is attached, and a second connection portion attachable to a portion of the wind turbine. The second connection portion may be arranged in an angle different from 0° or 180° towards the first connection portion, so that an attachment of the connector arrangement to a portion of a lightning down conductor is facilitated. An attachment portion of the connection element may abut for instance the first connection portion, to which the first end of the cable, or the second end of the cable, respectively, is attached. The second connection portion of the connection element, which is attachable to a portion of the wind turbine, may comprise for instance slits or holes for accommodating fixation means, in particular screws, bolts, rivets or the like for attaching the connection element to a portion of a wind turbine, in particular to an electrically conductive portion and/or a down conductor.

The first connection element and the second connection element are in particular electrically conductive. The bracket may be for instance an angled metal plate or the like. This allows for establishing an electrical connection between a portion of a lightning down conductor attached to the second connection portion of the first connection element and a further portion of a lightning down conductor attached the second connecting portion of the second connection element.

In embodiments of the invention, the first end and the second end of the cable each comprise a lug, wherein the lugs are each attached to the respective connection element by at least two offset fixation means. This prevents a loosening of the connection between the ends of the cable and the respective connection element, as it might occur due to the relative movements when only a single fixation means is used. Since two offset fixation means or two fixation means arranged in a distance to each other are used, a rotational movement of the lug at the end of the cable around the fixation means is prevented.

This enables a robust and reliable fixation between the cable and the connection elements, so that the connection is not affected by small amplitude swinging movements of the cable that may be possible inside the tube. This ensures an electrical connection between the cable and the connection elements also after a long lifetime of the connector arrangement or a large number of swinging movements, respectively.

In an embodiment, the cable comprises an electrically conductive core with a cross-sectional area between 20 mm$^2$ and 100 mm$^2$, in particular between 35 mm$^2$ and 70 mm$^2$. The electrically conductive core of the cable may be surrounded by an insulating sheath. The core may comprise one or more electrical conductors each contributing with their individual diameter to the cross-sectional area of the core. The cross-sectional area of the core may depend on the amount of connector arrangements, which are arranged in parallel at an interface in the lightning down conductor. The usage of comparably large cross-sectional areas allows for conducting high amplitude lightning currents through the connector arrangement without damaging the cable.

In an embodiment, the tube is a fibre-reinforced plastic tube. The fibre-reinforced plastic tube provides a high stiffness and a high mechanical stability so that a reliable restriction of the swinging movements of the cable may be obtained. Furthermore, due to its stiffness, the tube is less affected by swinging movements itself.

In embodiments of the invention, the tube comprises a lightning strike detection means, in particular a lightning card attached to the outer circumference of the tube. Since the lightning current is conducted through the connector arrangement during grounding, the tube of the connector arrangement is a suitable place for arranging a lightning strike detection means. As lightning strike detection means, for instance a lightning card, which records the magnetic field occurring during the conduction of a lightning current, may be arranged. The lightning card may then be used to detect that one or more lightning strikes have been conducted previously through the connector arrangement.

A wind turbine according to embodiments of the invention comprises at least one connector arrangement according to embodiments of the invention.

In an embodiment, the cable of the connector arrangement is integrated in a lightning down conductor of the wind turbine. The connector arrangement is in particular used to connect two lightning conductors of a lightning down conductor, wherein the first connection element and the second connection element are each connected to one of the lightning conductors. In particular, the connector arrangement is used to bridge a gap between the two lightning conductors which may occur for example at an interface region between two different components of the wind turbine.

In an embodiment, the connector arrangement is arranged between a rotor blade and a hub of the wind turbine. The first connection element is for instance attached to the hub of the wind turbine and the second connection element is attached to the root section of a rotor blade or vice versa. However, also an arrangement of the connector arrangement between two other parts of the wind turbine is possible.

All advantages and details described previously in relation to the connector arrangement according to embodiments of the invention apply correspondingly to the wind turbine according to embodiments of the invention and vice versa.

BRIEF DESCRIPTION

Figure 2:
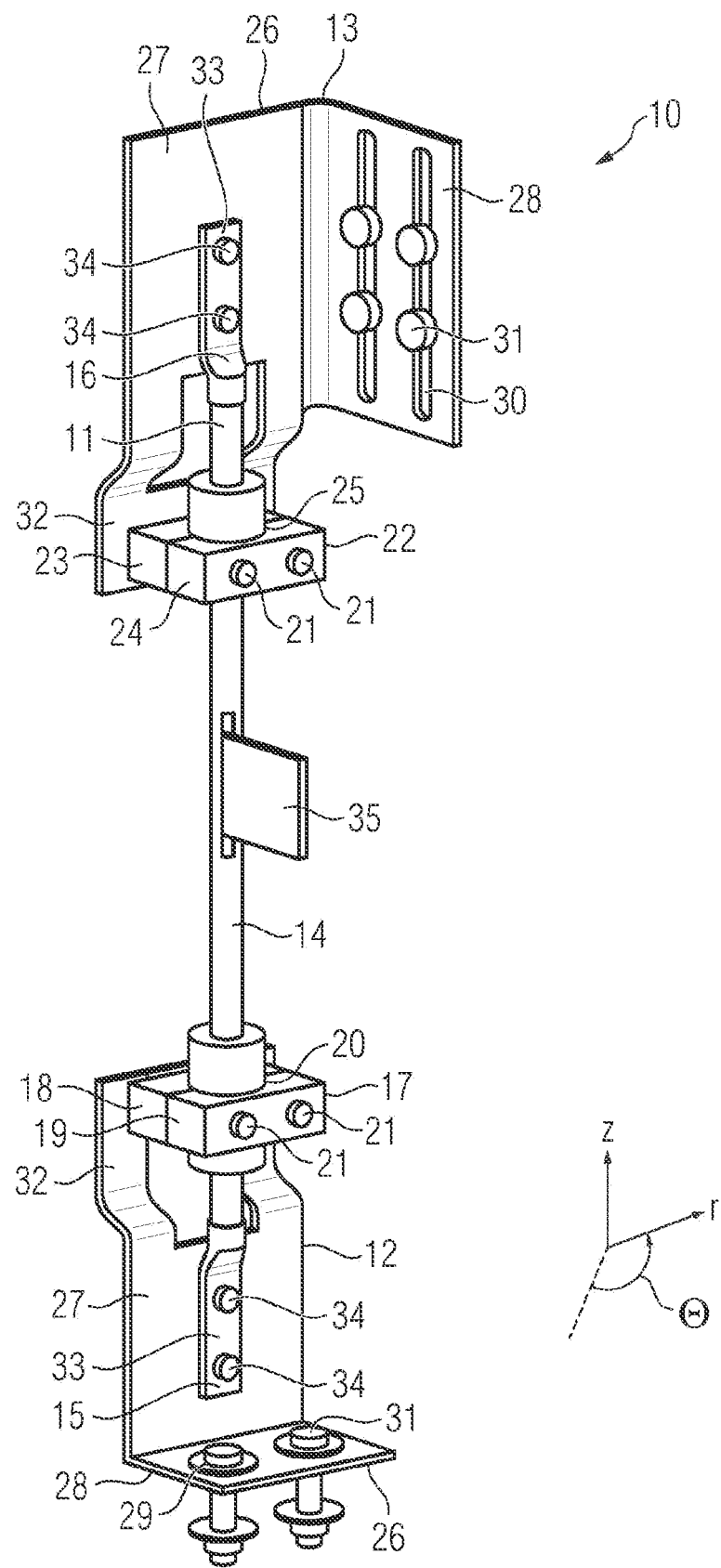

Some of the embodiments will be described in detail, with reference to the following figures, wherein like designations denote like members, wherein:

FIG. 1 shows an embodiment of a wind turbine according to embodiments of the invention; and FIG. 2 shows an embodiment of a connector arrangement according to embodiments of the invention.

DETAILED DESCRIPTION

In FIG. 1, an embodiment of a wind turbine 1 is shown. The wind turbine 1 comprises a tower 2 and a nacelle 3, to which a hub 4 bearing three rotor blades 5 is mounted. Furthermore, the wind turbine 1 comprises a lightning down conductor 6 which is used to ground lightning currents resulting from lightning strikes hitting the wind turbine 1, in particular in one of the rotor blades 5. The lightning down conductor 6 comprises a plurality of lightning conductors 7, 8, 9. To connect a first lightning conductor 7, which is arranged in the blade 5 of the wind turbine 1, to a lightning conductor 8, which is arranged in the hub 4 of the wind turbine 1, a connector arrangement 10 is used.

The depiction of the lightning down conductor 6 is simplified. In particular, further connecting means may be used for connecting the lightning conductor 8 in the hub 4 to the lightning conductor 9 in the nacelle 3 and the tower 2 allowing a rotation of the hub 3 with respect to the nacelle 3.

During operation of the wind turbine 1, the rotor blades 5 are subject to torsional loads resulting from the static weight of the rotor blades 5 and/or from the dynamic forces caused by the wind acting on the rotor blades 5. Therefore, the connector arrangement 10 connecting the lightning conductor 7 in the blade 5 to the lightning conductor 8 in the hub 4 has to be adapted to withstand the torsional loads occurring between the root side portion of the blade 5 and the hub 4.

Furthermore, since the hub 4 rotates during operation of the wind turbine 1, the connector arrangement 10 revolves around a central axis of the hub 4 and is therefore subject to an alternating gravitational force acting on the connector arrangement 10.

A lightning strike hitting for instance the topmost blade 5 is conducted through the lightning conductor 7 in the blade 5 and via the connector arrangement 10 also through the lightning conductor 8 in the hub 4 as well as through the further lightning conductors 9 of the lightning down conductor 6 to earth. Since the lightning current induced by the lightning strike may comprise a high amplitude, also high magnetic fields may occur. These magnetic fields may cause mechanical forces acting on the components of the lightning down conductor 6 and in particular also on the connector arrangement 10.

In FIG. 2 a connector arrangement 10 is shown. The connector arrangement 10 comprises a lightning conductor cable 11, a first connection element 12, a second connection element 13 and a tube 14. A first end 15 of the cable 11 is attached to the first connection element 12 and the second end 16 of the cable 11 is attached to the second connecting element 13. The tube 14 surrounds the electrically cable 11 at least partly between the first end 15 and the second end 16. The longitudinal direction of the cable 11 and the tube 14 is denoted by the z-axis. Correspondingly, the radial direction of the cable 11 and the tube 14 is denoted by the radial direction r and the circumferential direction of the cable 11 and the tube 14 is denoted as O.

The tube 14 is fixedly attached to the first connection element 12 and relatively movable to the second connection element 13. This enables the connector arrangement 10 to take a torsional load between the first connection element 12 and the second connection element 13, which may occur for instance when the first connecting element 12 is connected to a lightning conductor portion 8 arranged in a hub 4 of a wind turbine and the second connecting element 13 is connected to a lightning conductor portion 7 arranged in a blade 5 of a wind turbine 1. The torsional movement of the first connecting element 12 and the second connecting element 13 may occur in the circumferential direction as a twist around the longitudinal axis.

For taking these torsional loads, the inner diameter of the tube 14 is larger than an outer diameter of the cable 11, so that a gap or a void between the outer circumference of the cable 11 and the inner circumference of the tube 14 is created. The cable 11 may have a circular shape and an electrically conductive core comprising one or more electrical conductors. It is possible that the electrically conductive core of the cable 11 is surrounded by an electrically insulating sheath. The tube 14 comprises also a circular geometry surrounding a cylindrically shaped cavity, in which the cable 11 is arranged, so that the tube 14 may act as a cocoon of the cable 11. It is possible that the cable 11 and/or the tube 14 comprise a different shape of the outer circumference, or the inner circumference, respectively.

By providing a gap, in particular an air-filled gap, between the outer circumference of the cable 11 and the inner circumference of the tube 14, a torsional movement between the first connection element 12 and the second connection element 13 and hence a twisting of the cable is facilitated, since no friction between the cable 11 and the tube 14 occurs.

The tube 14 is rigidly fixed to the first connection element 12, so that a relative movement of the tube 13 with respect to the first connection element 12 is prevented. Therefore, the first connection element 12 comprises a fixation clamp 17, which tightly encompasses the outer circumference of the tube 14. The fixation clamp 17 comprises a lower part 18 and an upper part 19, which surround an orifice 20, or an opening, respectively. The diameter and the shape of the orifice 20 matches the diameter and the shape of the outer circumference of the tube 14, so that for example by two fixation means 21, the upper part 19 may be fixated against the lower part 18 of the fixation clamp 17 so that the tube 14 is fixedly attached by the fixation clamp 17 preventing any movement of the tube 14 relative to the first connection element 12.

The second connection element 13 comprises a restriction clamp 22 which is surrounding the tube 14 at least partly and which restricts a movement of the tube in radial direction of the tube 14. Also, the restriction clamp 22 may comprise a lower part 23 and an upper part 24 which surround an orifice 25. The orifice 25 may have the shape comparable to the shape of the outer surface of the tube 14, but exhibits a larger diameter, so that a torsional movement between the tube 14 and the restriction clamp 22, or the second connection element 13, respectively, is possible.

Besides the formation of the gap between the outer circumference of the tube 14 and the inner circumference of the restriction clamp 22, it is also possible that a sliding bearing between the outer circumference of the tube 14 and the restriction clamp 22 is formed. By such a sliding bearing, a movement of the tube 14 in radial direction is totally restricted, while a movement in longitudinal direction and also in circumferential direction remains possible.

The first connection element 12 and the second connection element 13 each comprise an angled metal bracket 26 with a first connection portion 27, to which the first end 15, or the second end 16, respectively, of the cable 11 is attached. Furthermore, the brackets 26 each comprise a second connection portion 28 which is attachable to a portion of a wind turbine 1. The second connection portion 28 is arranged in an angle to the first connection portion 27. The angle is in particular between 30° and 120°, for example 90°. The value of the angle and/or the shape of the bracket, hence the relative orientation of the first connection portion 27 to the second connection portion 28 of each of the brackets 26 may be adapted to the size and/or the structure of the wind turbine components to be connected by the connector arrangement 10. The second connection portions 28 may each comprise holes 29 and/or slits 30 for accommodating one or more fixation means 31, like screws, bolts or rivets.

The first connection element 12 and the second connection element 13 each comprise an attachment portion 32, which is arranged parallel to a portion of the tube 14, or a portion of the cable 11, respectively. The attachment portion 32 abuts the first connection portion 27 of the respective bracket 26. The attachment portion 32 may be a straight or a cranked supplement of the first connection portion 27. The fixation clamp 17 is attached to the attachment portion 32 of the first connection element 12. This may occur for instance by attaching the lower part 18 of the fixation clamp 17 to the attachment portion 32 and/or by the fixation means 21. Correspondingly, the restriction clamp 22 is attached to the attachment portion 32 of the second connection element 13.

The first end 15 and the second end 16 of the cable 11 are crimped and each end comprise a lug 34 which is attached to the first connection portion 27 of the bracket 26 of the first connection element 12 and the second connection element 13 by at least two fixation means 34. By using two fixation means 34, a loosening of the connection between the lug 34 and the respective connection element 12, 13 is prevented since a rotational movement of the first end 15 or the second end 16 of the cable 11 around the fixation means 34 is not possible. This prevents that alternating loads are acting on the fixation means 34 when the connector arrangement 12 rotates around the central axis of the hub 3 and a swinging movement, or a to-and-fro movement of the cable 11, respectively, occurs.

The fixation means 21, 31 and 34 may be for instance screws, bolts, rivets or the like. Also, a fixation of the lugs 33 of the first end 15 and the second end 16 of the cable 11 to the first connection portion 27 of the brackets 26 by welding or the like is possible.

Due to the flexibility of the cable 11, damages to the connector arrangement 10 during conducting of a lightning current are prevented, since the stress and the strain induced by the electromagnetic forces caused by the lightning current can be compensated by the flexibility of the cable 11. By using the tube 14, in particular a swinging movement of the cable 11 induced by the rotation of the hub is restricted since the cable 11 is encompassed by the tube 14. This prevents damage to the cable 11, since for instance a loosening of the at least one conductive core of the cable 11 from the crimped end portions, or the lugs 34, respectively, is prevented.

The rigid and immobilizing fixation of the tube 14 to the first connection element 12 and the relative movability of the tube 14 at least in longitudinal and circumferential direction with respect to the second connection element 13 allows for taking torsional loads in the connector arrangement 10 without damaging the cable 11 and/or the tube 14. Hence a reliable and stable connector arrangement 10 is obtained which prevents the occurrence of damage during the conduction of a lightning strike and/or during the operation of the wind turbine during its lifetime. A long lifetime of the connector arrangement 10 of 25 years and more can be achieved.

In order to conduct a lightning current, the cable 11 may comprise at least one electrically conductive core, for instance a copper core, with a cross-sectional area between 20 $mm^2$ and 100 $mm^2$, in particular 35 $mm^2$ and 70 $mm^2$. To ensure that the lightning current is conducted only through the electrical cable 11, the tube 14 may comprise, or consist of, respectively, an electrical insulating material. In particular, the tube 14 may be fabricated from a fibre-reinforced plastic material.

The brackets 26 of the first and second connection elements 12, 13 may consist of an electrically conductive material, for instance of a metal, allowing the conduction of an electrical current between the second connection portions 28, which may each attached to a lightning conductor 7, 8, 9, or the lightning down conductor 6, respectively. The fixation clamp 17, or its lower part 18 and its upper part 19, respectively, and/or the restriction clamp 22, or its lower part 23 and its upper part 24, respectively may consist of an electrically insulating material like plastic.

The length of the cable 11 and/or the length of the tube 14 may be for instance between 10 cm and 1 m, depending on the position of the connector arrangement 10 in the wind turbine 1. The tube 14 may comprise a lightning strike detection means 35, which is arranged between the fixation clamp 17 and the restriction clamp 22. The lightning strike detection means 35 may be for instance a lightning card, which records the occurrence of a magnetic field induced by a lightning strike current and conducted in the cable 11. The lightning strike detection means 35 allows for checking whether the connector arrangement 10 has been conducting a lightning strike current.

The first connection element 12 may be connected for instance to a lightning conductor 8 arranged in the hub 4 of the wind turbine 1. This lightning conductor 8 may be for instance a conductive base plate of the hub 4, which is connected to the further portions of a lightning down conductor 6. The second connection portion 13 may be connected for instance to a lightning conductor 7 in a root region of a rotor blade 5. Also, an attachment of the connector arrangement 10 vice versa is possible. The connector arrangement 10 can also be used in further areas of the wind turbine 1 for bridging an interface between two different lightning conductor portions of the lightning conductor 6.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A connector arrangement for a wind turbine down conductor, comprising a lightning conductor cable, a first connection element, a second connection element and a tube, wherein a first end of the cable is connected to the first connection element and a second end of the cable is connected to the second connection element, wherein the cable is electrically connected to the first connection element and the second connection element, wherein the tube surrounds at least a portion of the cable between the first end and the second end of the cable, wherein the tube is fixedly attached to the first connection element and relatively movable to the second connection element.

2. The connector arrangement according to claim 1, wherein a gap is formed between an outer circumference of the cable and an inner circumference of the tube.

3. The connector arrangement according to claim 1, wherein the first connection element includes a fixation clamp, which tightly encompasses an outer circumference of the tube for fixation of the tube.

4. The connector arrangement according to claim 1, wherein the second connection element includes a restriction clamp surrounding the tube at least partly and restricting a movement of the tube in a radial direction of the tube.

5. The connector arrangement according to claim 4, wherein the tube and the restriction clamp form a sliding bearing or that a gap is formed between an outer circumference of the tube and an inner circumference of the restriction clamp.

6. The connector arrangement according to claim 3, wherein the first connection element and/or the second connection element include an attachment portion, which is aligned parallel to a portion of the cable, wherein the respective clamp of the connection element is attached to the attachment portion.

7. The connector arrangement according to claim 1, wherein the first connection element and/or the second connection element include a bracket with a first connection portion, to which the end of the cable is attached, and a second connection portion attachable to a portion of a wind turbine.

8. The connector arrangement according to claim 1, wherein the first end and the second end of the cable each include a lug, wherein the lugs are each attached to their respective connection elements by at least two offset fixation means.

9. The connector arrangement according to claim 1, wherein the cable includes an electrically conductive core with a cross-sectional area between 20 mm$^2$ and 100 mm$^2$.

10. The connector arrangement according to claim 1, wherein the tube is a fibre-reinforced plastic tube.

11. The connector arrangement according to claim 1, wherein the tube includes a lightning strike detection means.

12. A wind turbine comprising at least one connector arrangement having a lightning conductor cable, a first connection element, a second connection element, and a tube,
- wherein a first end of the lightning conductor cable is electrically connected to the first connection element and a second end of the lightning conductor cable is electrically connected to the second connection element,
- wherein the tube surrounds at least a portion of the lightning conductor cable between the first end and the second end, and
- wherein the tube is fixedly attached to the first connection element and relatively movable with respect to the second connection element.

13. The wind turbine according to claim 12, wherein the lightning conductor cable is integrated in a lightning down conductor of the wind turbine.

14. The wind turbine according to claim 12, wherein the at least one connector arrangement is arranged between a rotor blade and a hub of the wind turbine.

15. The connector arrangement according to claim 11, wherein the lightning strike detection means includes a lightning card attached to an outer circumference of the tube.

* * * * *